United States Patent
Rodriguez et al.

(10) Patent No.: US 12,172,321 B2
(45) Date of Patent: Dec. 24, 2024

(54) WORK MODE AND TRAVEL MODE FOR MOBILE ROBOTS

(71) Applicant: Boston Dynamics, Inc., Waltham, MA (US)

(72) Inventors: Adrianna Rodriguez, Waltham, MA (US); Alexander Douglas Perkins, Arlington, MA (US)

(73) Assignee: Boston Dynamics, Inc., Waltham, MA (US)

( * ) Notice: Subject to any disclaimer, the term of this patent is extended or adjusted under 35 U.S.C. 154(b) by 0 days.

(21) Appl. No.: 17/446,228

(22) Filed: Aug. 27, 2021

(65) Prior Publication Data
US 2021/0402605 A1    Dec. 30, 2021

Related U.S. Application Data

(63) Continuation of application No. 16/277,034, filed on Feb. 15, 2019, now Pat. No. 11,130,235.

(51) Int. Cl.
*B25J 9/16*    (2006.01)
*B25J 5/00*    (2006.01)

(52) U.S. Cl.
CPC ............. *B25J 9/1669* (2013.01); *B25J 5/007* (2013.01); *B25J 9/1641* (2013.01)

(58) Field of Classification Search
CPC ........ B25J 9/1669; B25J 9/1641; B25J 9/162; B25J 5/007; B25J 19/002; G05B 2219/40077
See application file for complete search history.

(56) References Cited

U.S. PATENT DOCUMENTS

| | | | |
|---|---|---|---|
| 5,515,934 A | 5/1996 | Davis | |
| 7,228,203 B2 | 6/2007 | Koselka et al. | |
| 9,889,562 B1 | 2/2018 | Rembisz | |
| 10,100,968 B1 | 10/2018 | Chow et al. | |
| 10,556,630 B1* | 2/2020 | Bingham | B62D 37/00 |
| 11,130,235 B2 | 9/2021 | Rodriguez et al. | |
| 2008/0105481 A1* | 5/2008 | Hutcheson | B60L 15/20 |
| | | | 180/209 |
| 2010/0206651 A1 | 8/2010 | Nagasaka | |
| 2011/0040427 A1* | 2/2011 | Ben-Tzvi | B62D 55/075 |
| | | | 701/2 |

(Continued)

FOREIGN PATENT DOCUMENTS

| | | |
|---|---|---|
| WO | 2008142642 A1 | 11/2008 |
| WO | WO 2008/142642 | 11/2008 |

*Primary Examiner* — Khoi H Tran
*Assistant Examiner* — Nhi Q Bui
(74) *Attorney, Agent, or Firm* — PIERCE ATWOOD LLP

(57) ABSTRACT

A method for operating a robot includes receiving a drive command to drive the robot across a work surface. The drive command includes a work mode command or a travel mode command. In response to receiving the work mode command, the method includes operating the robot in a work mode. In the work mode, the robot dynamically balances on a right drive wheel and a left drive wheel on the work surface, while keeping a non-drive wheel off of the work surface. In response to receiving the travel mode command, the method includes operating the robot in a travel mode. In the travel mode, the robot statically balances on the right drive wheel, the left drive wheel, and the non-drive wheel in contact with the work surface.

19 Claims, 12 Drawing Sheets

(56) References Cited

U.S. PATENT DOCUMENTS

| | | |
|---|---|---|
| 2011/0071667 A1 | 3/2011 | Spano, Jr. et al. |
| 2011/0071677 A1 | 3/2011 | Stillman |
| 2011/0148364 A1 | 6/2011 | Ota |
| 2013/0152724 A1* | 6/2013 | Mozeika ............... B25J 9/0015 294/213 |
| 2013/0325182 A1* | 12/2013 | Setrakian ............... B25J 9/161 700/264 |
| 2015/0374564 A1* | 12/2015 | Sutton ................... A61G 5/128 280/657 |
| 2016/0274579 A1* | 9/2016 | So .......................... A47L 9/2857 |
| 2016/0325432 A1* | 11/2016 | Tian ....................... B25J 19/023 |
| 2017/0008176 A1 | 1/2017 | Wiley |
| 2017/0009816 A1* | 1/2017 | Wiley ..................... F16D 7/027 |
| 2017/0095301 A1* | 4/2017 | Brisson ................. B25J 9/1607 |
| 2017/0095382 A1* | 4/2017 | Wen ......................... A61G 5/04 |
| 2017/0329333 A1* | 11/2017 | Passot ................. G05D 1/0272 |
| 2018/0215040 A1* | 8/2018 | Asahara ................ B25J 9/1694 |
| 2018/0264641 A1 | 9/2018 | Kemp et al. |
| 2019/0168391 A1* | 6/2019 | Ohm ....................... B25J 19/02 |

* cited by examiner

WORK MODE AND TRAVEL MODE FOR MOBILE ROBOTS

CROSS REFERENCE TO RELATED APPLICATIONS

This U.S. patent application is a continuation of, and claims priority under 35 U.S.C. § 120 from, U.S. patent application Ser. No. 16/277,034, filed on Feb. 15, 2019. The disclosure of this prior application is considered part of the disclosure of this application and is hereby incorporated by reference in its entirety.

TECHNICAL FIELD

This disclosure relates to mobile robots operating in a work mode and a travel mode.

BACKGROUND

Robots currently perform tasks in various working environments, such as factories, storage facilities, office buildings, and hospitals. Often, these robots are dynamically balanced on two wheels. Dynamically balanced robots are desired for a number of reasons. For example, dynamically balanced robots may handle significantly heavier or larger loads relative to their mass and are excellent tools for mobile manipulation. However, when upright, these robots may have a significant amount of potential energy stored and the algorithms that control them are often lengthy and complicated.

SUMMARY

One aspect of the disclosure provides a method for operating a robot in a work mode and a travel mode. The method includes receiving, at data processing hardware of the robot, a drive command to drive the robot across a work surface. The drive command includes a work mode command or a travel mode command. In response to receiving the work mode command, the method also includes operating, by the data processing hardware, the robot in a work mode, where the robot dynamically balances on a right drive wheel and a left drive wheel on the work surface, while keeping a non-drive wheel off of the work surface. In response to receiving the travel mode command, the method further includes operating, by the data processing hardware, the robot in a travel mode, where the robot statically balances on the right drive wheel, the left drive wheel, and the non-drive wheel in contact with the work surface.

Implementations of the disclosure may include one or more of the following optional features. In some implementations, the non-drive wheel includes a passive caster wheel. In some examples, the robot includes an inverted pendulum body and a counter-balance body disposed on the inverted pendulum body and configured to move relative to the inverted pendulum body. The right drive wheel may be rotatably coupled to the inverted pendulum body, the left drive wheel may be rotatably coupled to the inverted pendulum body, and the non-drive wheel may be rotatably coupled to the counter-balance body. In some examples, the robot includes a right leg prismatically coupled to the inverted pendulum body with the right drive wheel rotatably coupled to the right leg and a left leg prismatically coupled to the inverted pendulum body with the left drive wheel rotatably coupled to the left leg. In other examples, the counter-balance body includes a battery. In some implementations, the robot includes a counter-balance body actuator configured to move the counter-balance body relative to the inverted pendulum body. The counter-balance body actuator may be configured to move the counter-balance body relative to the inverted pendulum body when the robot operates in the travel mode to adjust a wheel base between the non-drive wheel and the left and right drive wheels in contact with the work surface. In some examples, the robot includes at least one articulated arm disposed on the inverted pendulum body and configured to move relative to the inverted pendulum body. In other examples, the at least one articulated arm includes at least one joint with the at least one joint having a range of motion. When the robot operates in the travel mode, the at least one articulated arm stows in an attitude at an end of the range of motion of the at least one joint. In some implementations, the robot has a center of mass, the center of mass disposed further away from the work surface when the robot operates in work mode than when the robot operates in the travel mode. When operating the robot in the travel mode, the robot may further statically balance on a second non-drive wheel in contact with the work surface. In some examples, a number of actuators active/enabled during operation in the travel mode is less than a number of actuators active/enabled during operation in the work mode. Optionally, the robot operates autonomously during operation in the work mode and the robot operates manually via user input during operation in the travel mode.

Another aspect of the disclosure provides a robot. The robot includes an inverted pendulum body and a counter-balance body disposed on the inverted pendulum body and configured to move relative to the inverted pendulum body. The robot also includes a right leg having first and second ends. The first end of the right leg is coupled to the inverted pendulum body. The robot also includes a left leg having first and second ends. The first end of the left leg is also coupled to the inverted pendulum body. The robot further includes a right drive wheel coupled to the second end of the right leg, a left drive wheel coupled to the second end of the left leg, and a non-drive wheel coupled to the counter-balance body. The robot also includes a controller in communication with the counter-balance body, the right leg, the left leg, the right drive wheel, and the left drive wheel. The controller is configured to perform operations. The operations include receiving a drive command to drive the robot across a work surface, and the drive command includes a work mode command or a travel mode command. The operations also include, in response to receiving the work mode command, operating the robot in a work mode. In the work mode, the robot dynamically balances on the right drive wheel and the left drive wheel on the work surface while keeping the non-drive wheel off of the work surface. The operations also include, in response to receiving the travel mode command, operating the robot in a travel mode. In the travel mode, the robot statically balances on the right drive wheel, the left drive wheel, and the non-drive wheel in contact with the work surface.

This aspect of the disclosure may include one or more of the following optional features. In some implementations, the non-drive wheel includes a passive caster wheel. In some examples, the right leg is prismatically coupled to the inverted pendulum body, the right drive wheel is rotatably coupled to the right leg, the left leg is prismatically coupled to the inverted pendulum body, and the left drive wheel is rotatably coupled to the left leg. Additionally, the counter-balance body may include a battery. The robot may include a counter-balance body actuator configured to move the counter-balance body relative to the inverted pendulum body. The counter-balance body actuator, in some examples, is configured to move the counter-balance body relative to the inverted pendulum body when the robot operates in the travel mode to adjust a wheel base between the non-drive wheel and the left and right drive wheels in contact with the work surface. In other examples, the robot includes at least one articulated arm disposed on the inverted pendulum body and configured to move relative to the inverted pendulum body. Additionally the robot may include at least one articulated arm that includes at least one joint. The at least one joint has a range of motion, and, when the robot operates in the travel mode, the at least one articulated arm stows in an attitude at an end of the range of motion of the at least one joint. In some implementations, the robot includes a center of mass, the center of mass disposed further away from the work surface when the robot operates in the work mode than when the robot operates in the travel mode. The robot may further include a second non-drive wheel coupled to the counter-balance body. When operating the robot in the travel mode, the robot may further statically balance on the second non-drive wheel in contact with the work surface. In some examples, a number of actuators active/enabled during operation in the travel mode is less than a number of actuators active/enabled during operation in the work mode. In other examples, the robot operates autonomously during operation in the work mode and the robot operates manually via user input during operation in the travel mode.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Dynamically balanced robots may perform tasks in various working environments, such as factories, storage facilities, office buildings, and hospitals. While performing these tasks in a work mode, the robot may be in a high energy state (i.e., kinetic energy and potential energy). The robot may be operating autonomously and reliant on a large number of actuators and sensors. Because of this, the robot may be confined to an isolated work cell for safety. When leaving the isolated work cell or when near humans, the robot may assume a traveling mode that minimizes potential energy of the robot and is less reliant on using actuators and sensors. Once the robot returns to a work environment or resumes work activities, the robot may need to resume back to the work mode. Implementations herein are directed toward switching a robot from a work mode to a travel model by moving a non-drive wheel into contact with the work surface to statically balance the robot and to lower a center of mass of the robot.

Figure 1A:
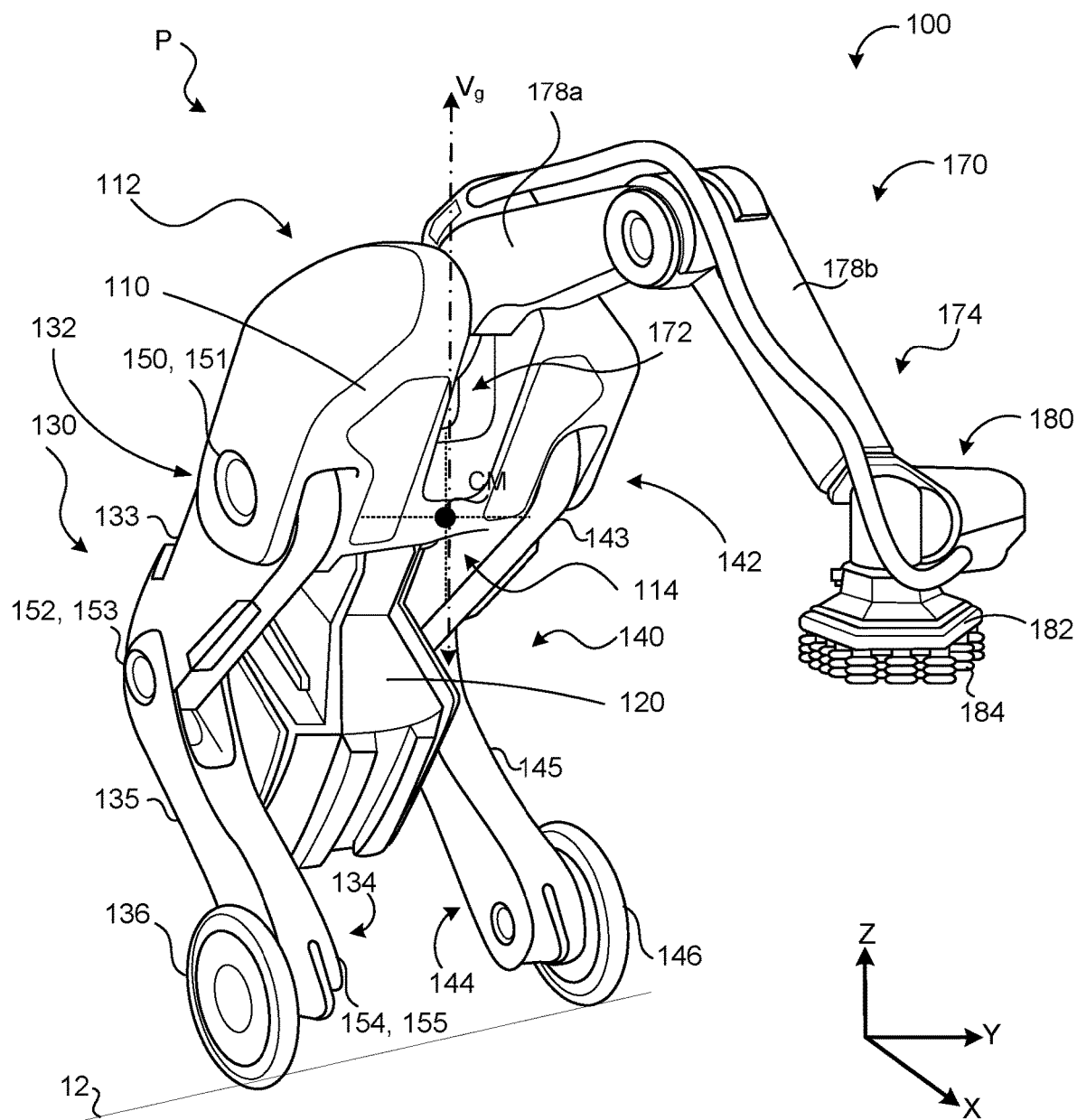
FIG. 1A is a schematic view of an example robot.
Figure 1B:
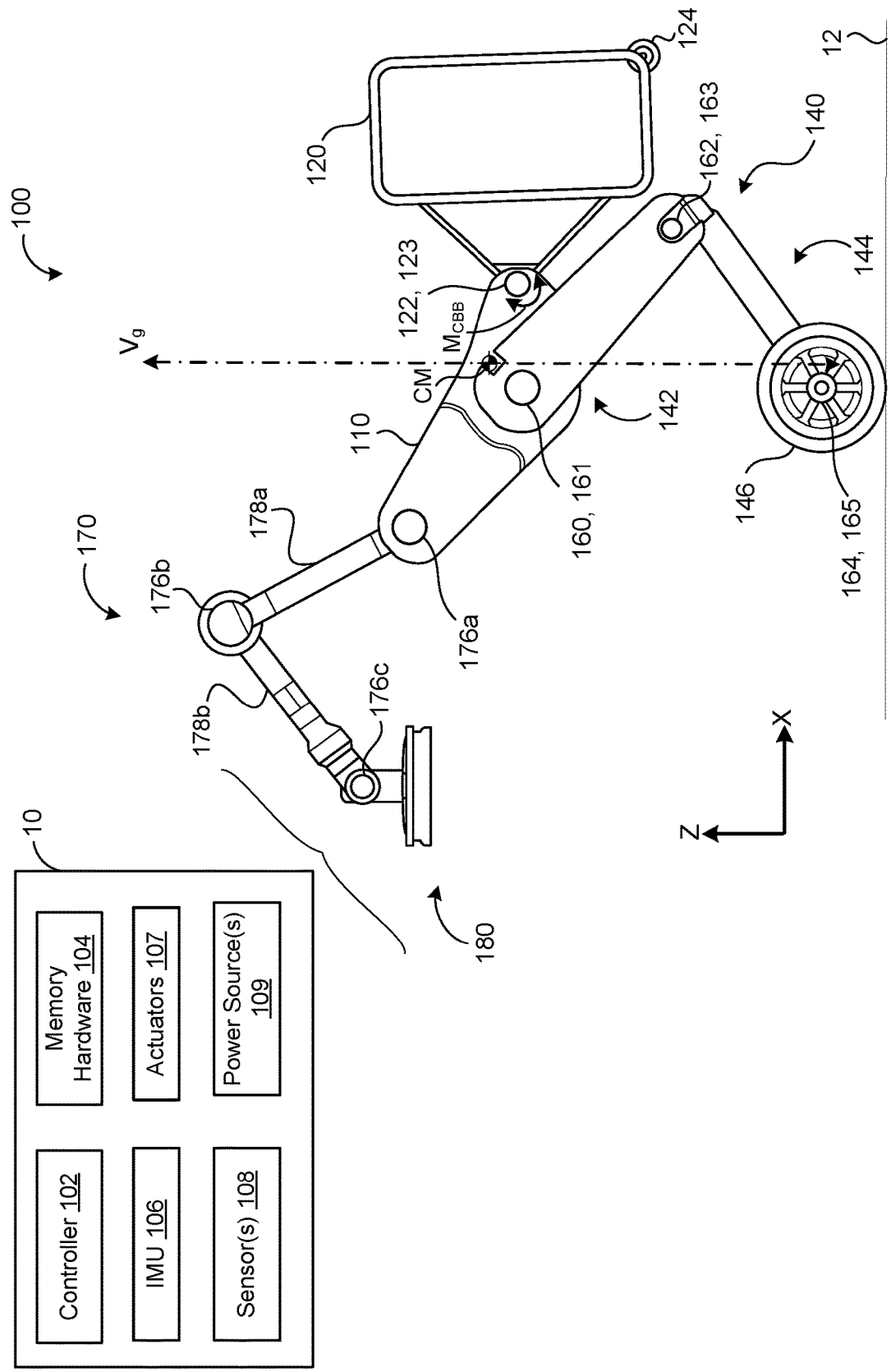
FIG. 1B is a schematic view of the robot of FIG. 1A.

Referring to FIGS. 1A and 1B, in some implementations, a robot 100 includes an inverted pendulum body (IPB) 110, a counter-balance body 120 disposed on the IPB 110, a right leg 130 having a first end 132 coupled to the IPB 110 and a second end 134, and a right drive wheel 136 rotatably coupled to the second end 134 of the right leg 130. The robot also includes a left leg 140 having a first end s142 coupled to the IPB 110 and a second end 144, and a left drive wheel 146 rotatably coupled to the second end 144 of the left leg 140. The robot 100 has a vertical gravitational axis $V_g$ along a direction of gravity, and a center of mass CM, which is a point where the robot 100 has a zero sum distribution of mass. The robot 100 further has a pose P based on the CM relative to the vertical gravitational axis $V_g$ to define a particular attitude or stance assumed by the robot 100. The attitude of the robot 100 can be defined by an orientation or an angular position of an object in space.

The IPB 110 has first and second end portions 112, 114 and may be interchangeably referred to as a torso 110 for the robot 100. In some implementations, the counter-balance body 120 is disposed on the second end portion 114 of the IPB 110 and configured to move relative to the IPB 110. The counter-balance body 120 may be interchangeably referred to as a tail 120. In some examples, the counter-balance body 120 is a battery that serves to power the robot 100. A back joint 122 may rotatably couple the counter-balance body 120 to the first end portion 112 of the IPB 110 to allow the counter-balance body 120 to rotate relative to the IPB 110. The back joint 122 may be referred to as a pitch joint. In the example shown, the back joint 122 supports the counter-balance body 120 to allow the counter-balance body 120 to move/pitch around a lateral axis (y-axis) that extends perpendicular to the gravitational vertical axis $V_g$ and a fore-aft axis (x-axis) of the robot 100. The fore-aft axis (x-axis) may denote a present direction of travel by the robot 100. Movement by the counter-balance body 120 relative to the IPB 110 alters the pose P of the robot 100 by moving the CM of the robot 100 relative to the vertical gravitational axis $V_g$. The rotational actuator 123 (e.g., a tail actuator or counter-balance body actuator) may be positioned at or near the back joint 122 for controlling movement by the counter-balance body 120 (e.g., tail) about the lateral axis (y-axis). The rotational actuator 123 may include an electric motor, electro-hydraulic servo, piezo-electric actuator, solenoid actuator, pneumatic actuator, or other actuator technology suitable for accurately effecting movement of the counter-balance body 120 relative to the IPB 110.

The rotational movement by the counter-balance body 120 relative to the IPB 110 alters the pose P of the robot 100 for balancing and maintaining the robot 100 in an upright position. For instance, similar to rotation by a flywheel in a conventional inverted pendulum flywheel, rotation by the counter-balance body 120 relative to the gravitational vertical axis $V_g$ generates/imparts the moment $M_{CBB}$ at the back joint 122 to alter the pose P of the robot 100. By moving the counter-balance body 120 relative to the IPB 110 to alter the pose P of the robot 100, the CM of the robot 100 moves relative to the gravitational vertical axis Vg to balance and maintain the robot 100 in the upright position in scenarios when the robot 100 is moving and/or carrying a load. However, by contrast to the flywheel portion in the conventional inverted pendulum flywheel that has a mass centered at the moment point, the counter-balance body 120 includes a corresponding mass that is offset from moment $M_{CBB}$ imparted at the back joint 122. In some configurations, a gyroscope disposed at the back joint 122 could be used in lieu of the counter-balance body 120 to spin and impart the moment $M_{CBB}$ (rotational force) for balancing and maintaining the robot 100 in the upright position.

The counter-balance body 120 may rotate (e.g., pitch) about the back joint 122 in both the clockwise and counter-clockwise directions (e.g., about the y-axis in the "pitch direction" relative to the view shown in FIG. 1B) to create an oscillating (e.g., wagging) movement. Movement by the counter-balance body 120 relative to IPB 110 between positions causes the CM of the robot 100 to shift (e.g., lower toward the ground surface 12 or higher away from the ground surface 12). The counter-balance body 120 may oscillate between movements to create the wagging movement. The rotational velocity of the counter-balance body 120 when moving relative to the IPB 110 may be constant or changing (accelerating or decelerating) depending upon how quickly the pose P of the robot 100 needs to be altered for dynamically balancing the robot 100.

With continued reference to FIGS. 1A and 1B, a right hip joint 150 may rotatably couple the first end 132 of the right leg 130 to the second end portion 114 of the IPB 110 to allow at least a portion of the right leg 130 to move/pitch around the lateral axis (y-axis) relative to the IPB 110. A leg actuator 151 associated with the hip joint 150 may cause the upper portion 133 of the right leg 130 to move/pitch around the lateral axis (y-axis) relative to the IPB 110. In some configurations, the right leg 130 includes the corresponding upper portion 133 and a corresponding lower portion 135. The upper portion 133 may extend from the hip joint 150 at the first end 132 to a corresponding knee joint 152 and the lower portion 135 may extend from the knee joint 152 to the second end 420a. A right knee actuator 153 associated with the right knee joint 152 may cause the lower portion 135 of the right leg 130 to move/pitch about the lateral axis (y-axis) relative to the upper portion 133 of the right leg 130.

The right leg 130 may include a corresponding right ankle joint 154 configured to rotatably couple the right drive wheel 136 to the second end 134 of the right leg 130. Here, the right ankle joint 154 may be associated with a wheel axle coupled for common rotation with the right drive wheel 136 and extending substantially parallel to the lateral axis (y-axis). The right drive wheel 136 may include a corresponding torque actuator (drive motor) 155 configured to apply a corresponding axle torque for rotating the right drive wheel 136 about the ankle joint 154 to move the right drive wheel 136 across the ground surface 12 (which may be interchangeably referred to as a work surface 12) along the fore-aft axis (x-axis). For instance, the axle torque may cause the right drive wheel 136 to rotate in a first direction for moving the robot 100 in a forward direction along the fore-aft axis (x-axis) and/or cause the right drive wheel 136 to rotate in an opposite second direction for moving the robot 100 in a rearward direction along the fore-aft axis (x-axis).

A left hip joint 160 may rotatably couple the first end 142 of the left leg 140 to the second end portion 114 of the IPB 110 to allow at least a portion of the left leg 140 to move/pitch around the lateral axis (y-axis) relative to the IPB 110. A corresponding leg actuator 161 associated with the left hip joint 160 may cause a corresponding upper portion 143 of the left leg 140 to move/pitch around the lateral axis (y-axis) relative to the IPB 110. As with the right leg 130, the left leg 140 may include the corresponding upper portion 143 and a corresponding lower portion 145. The upper portion 143 may extend from the hip joint 160 at the first end 142 to a corresponding knee joint 162 and the lower portion 145 may extend from the knee joint 162 to the second end 144. A left knee actuator 163 associated with the left knee joint 162 may cause the lower portion 145 of the left leg 140 to move/pitch about the lateral axis (y-axis) relative to the upper portion 143 of the left leg 140.

The left leg 140 may include a corresponding left ankle joint 164 configured to rotatably couple the left drive wheel 146 to the second end 144 of the left leg 140. Here, the left ankle joint 164 may be associated with a wheel axle coupled for common rotation with the left drive wheel 146 and extending substantially parallel to the lateral axis (y-axis). As with the right drive wheel 136, the left drive wheel 146 may include a corresponding torque actuator (e.g., drive motor) 165 configured to apply a corresponding axle torque for rotating the left drive wheel 146 about the ankle joint 164 to move the left drive wheel 146 across the ground surface 12 along the fore-aft axis (x-axis). For instance, the axle torque may cause the left drive wheel 146 to rotate in the first direction for moving the robot 100 in the forward direction along the fore-aft axis (x-axis) and/or cause the left drive wheel 146 to rotate in the opposite second direction for moving the robot 100 in the rearward direction along the fore-aft axis (x-axis).

In some implementations, the legs 130, 140 are prismatically coupled to the IPB 110 such that the length of each leg 130, 140 may expand and retract via a corresponding belt drive actuator (e.g., actuators 151, 161) proximate the hip joints 150, 160 configured to drive a corresponding belt (not shown) coupled for common rotation with the corresponding knee joint 152, 162. Here, the controller 102 may actuate the belt drive actuator associated with each leg 130, 140 to rotate the corresponding upper portion 133, 143 relative to the IPB 110 in one of a clockwise or counter-clockwise direction and drive the belt in one direction to prismatically extend/expand the length of the leg 130, 140 by causing the corresponding lower portion 135, 145 to rotate about the corresponding knee joint 152, 162 relative to the corresponding upper portion 133, 143 in the other one of the clockwise or counter-clockwise direction. The controller 102 may actuate each belt drive actuator to drive the belt in the opposite direction to prismatically retract the length of each corresponding leg 130, 140. Thus, in these limitations, the actuator 153, 163 at the knee joints 152, 162 may be omitted. In some examples, the belt drive actuator and belt employs a 2:1 belt coupling so that the lower portion 135, 145 rotates about the knee joint 152, 162 relative to the upper portion 133, 143 at twice the angle of the rotation of the upper portion 133, 143 about the hip joint 150, 160, thereby causing the second end 134, 144 of the leg 130, 140 to move on a straight line equivalent to a linear rail. Optionally, instead of a two-link leg, the at least one leg 130, 140 may include a single link that prismatically extends/retracts linearly such that the second end 134, 144 of the leg 130, 140 prismatically moves away/toward the IPB 110 along a linear rail. In other configurations, the knee joint 152, 162 may employ a corresponding rotational actuator 153, 163 for rotating the lower portion 135, 145 relative to the upper portion 133, 143 in lieu of the belt driven by the belt drive actuator 151, 161 disposed at or near the hip joint 150, 160.

The corresponding axle torques applied to each of the drive wheels 136, 146 may vary to maneuver the robot 100 across the ground surface 12. For instance, an axle torque applied to the right drive wheel 136 that is greater than an axle torque applied to the left drive wheel 146 may cause the robot 100 to turn to the left, while applying a greater axle torque to the left drive wheel 146 than to the right drive wheel 136 may cause the robot 100 to turn to the right. Similarly, applying substantially the same magnitude of axle torque to each of the drive wheels 136, 146 may cause the robot 100 to move substantially straight across the ground surface 12 in either the forward or reverse directions. The magnitude of axle torque applied to each of the drive wheels 136, 146 also controls velocity of the robot 100 along the fore-aft axis (x-axis). Optionally, the drive wheels 136, 146 may rotate in opposite directions to allow the robot 100 to change orientation by swiveling on the ground surface 12. Thus, each axle torque may be applied to the corresponding drive wheel 136, 146 independent of the axle torque (if any) applied to the other drive wheel 136, 146.

As explained in more detail below, the counter-balance body 120 also includes at least one non-drive wheel 124. The non-drive wheel 124 is passive (e.g., a passive caster wheel) and does not contact the ground surface 12 while the robot 100 is dynamically balanced in the work mode 210 (e.g., while the robot 100 is lifting or moving objects).

In some implementations, the robot 100 further includes one or more appendages, such as an articulated arm 170 disposed on the IPB 110 and configured to move relative to the IPB 110. The articulated arm 170 may have five-degrees of freedom. Moreover, the articulated arm 170 may be interchangeably referred to as a manipulator arm or simply an appendage. While FIGS. 1A and 1B show the articulated arm 170 disposed on the first end portion 112 of the IPB 110, the articulated arm 170 may be disposed on the second end portion 114 of the IPB 110 in other configurations. The articulated arm 170 extends between a proximal first end 172 and a distal second end 174. In some examples, the first end 172 connects to the IPB 110 at a first articulated arm joint 176a. The first articulated arm joint 176a may be disposed between the right and left hip joints 150, 160 to center the articulated arm 170 between the left and right sides of the IPB 110. In some examples, the first articulated arm joint 176a rotatably couples the proximal first end 172 of the articulated arm 170 to the IPB 110 to enable the manipulator arm 170 to rotate relative to the IPB 110. For instance, the articulated arm 170 may move/pitch about the lateral axis (y-axis) relative to the IPB 110. In the example shown, the articulated arm 170 includes two portions 178a, 178b rotatable relative to one another and also the IPB 110; however, the articulated arm 170 may include more or less portions without departing from the scope of the present disclosure. The first portion 178a may be separated from second portion 178b by a second articulated arm joint 176b. An end effector 180, which may be interchangeably referred to as a manipulator head 180, may be coupled to the distal second end of the second portion 178b of the articulated arm 170 and may include one or more actuators 182 for gripping/grasping objects. The end effector 180 may optionally include one or more suction cups 184 configured to provide a vacuum seal between the end effector 180 and a target object to allow the articulated arm 170 to carry the target object. The second portion 178b and the end effector 180 may be separated by a third articulated arm joint 176c.

The articulated arm 170 may move/pitch about the lateral axis (y-axis) relative to the IPB 110. For instance, the articulated arm 170 may rotate about the lateral axis (y-axis) relative to the IPB 110 in the direction of gravity to lower the CM of the robot 100 while executing turning maneuvers. The counter-balance body 120 may also simultaneously rotate about the lateral axis (y-axis) relative to the IPB 110 in the direction of gravity to assist in lowering the CM of the robot 100. Here, the articulated arm 170 and the counter-balance body 120 may cancel out any shifting in the CM of the robot 100 in the forward or rearward direction along the fore-aft axis (x-axis), while still effectuating the CM of the robot 100 shift downward closer to the ground surface 12.

With continued reference to FIG. 1B, the robot 100 includes a control system 10 configured to monitor and control operation of the robot 100. In some implementations, the robot 100 is configured to operate autonomously and/or semi-autonomously. However, a user may also operate the robot by providing commands/directions to the robot 100. In the example shown, the control system 10 includes a controller 102 (e.g., data processing hardware), memory hardware 104, an inertial measurement unit 106, actuators 107, one or more sensors 108, and one or more power sources 109. The control system 10 is not limited to the components shown, and may include additional or less components without departing from the scope of the present disclosure. The components may communicate via wireless or wired connections and may be distributed across multiple locations of the robot 100. In some configurations, the control system 10 interfaces with a remote computing device and/or a user. For instance, the control system 10 may include various components for communicating with the robot 100, such as a joystick, buttons, wired communication ports, and/or wireless communication ports for receiving inputs from the remote computing device and/or user, and providing feedback to the remote computing device and/or user.

The controller 102 corresponds to data processing hardware that may include one or more general purpose processors, digital signal processors, and/or application specific integrated circuits (ASICs). In some implementations, the controller 102 is a purpose-built embedded device configured to perform specific operations with one or more subsystems of the robot 100. The memory hardware 104 is in communication with the controller 102 and may include one or more non-transitory computer-readable storage media such as volatile and/or non-volatile storage components. For instance, the memory hardware 104 may be associated with one or more physical devices in communication with one another and may include optical, magnetic, organic, or other types of memory or storage. The memory hardware 104 is configured to inter alia, to store instructions (e.g., computer-readable program instructions), that when executed by the controller 102, cause the controller to perform numerous operations, such as, without limitation, altering the pose P of the robot 100 for maintaining balance, maneuvering the robot 100 across the ground surface 12, transporting objects, and/or executing a travel mode or a work mode. The controller 102 may directly or indirectly interact with the inertial measurement unit 106, the actuators 107, the sensor(s) 108, and the power source(s) 109 for monitoring and controlling operation of the robot 100.

The inertial measurement unit 106 is configured to measure an inertial measurement indicative of a movement of the robot 100 that results in a change to the pose P of the robot 100. The inertial measurement measured by the inertial measurement unit 106 may indicate a translation or shift of the CM of the robot 100 relative to the vertical gravitational axis $V_g$. The translation or shift of the CM may occur along one or more of the fore-aft axis (x-axis), the lateral axis (y-axis), or the vertical axis (z-axis). For instance, the inertial measurement unit 106 may detect and measure an acceleration, a tilt, a roll, a pitch, a rotation, or yaw of the robot 100, as the inertial measurement, using an initial pose P as an inertial reference frame. To detect and to measure, the inertial measurement unit 106 may include at least one of a tri-axial accelerometer, a tri-axial magnetometer, or a tri-axial gyroscope. The tri-axial accelerometer includes circuitry to sense the movement of the robot 100 between poses along a straight line or an axis, such as a position and an orientation of the inertial measurement unit 106. In some examples, the accelerometer may use a mass-spring system or a vibration system configured to determine an acceleration corresponding to a displacement of a mass in the mass-spring system or a stress related to a vibration in the vibration system. The inertial measurement unit 106 may also include a gyroscope, such as the tri-axial gyroscope, to measure a rate of rotation about a defined axis. The gyroscope is configured to sense rotation of the inertial measurement unit 106 such that a sensed rotation is a portion of the inertial measurement output to the controller 102. The controller 102 receives the inertial measurement of the inertial measurement unit 106 and determines shifts in the CM of the robot 100 relative to the vertical gravitational axis $V_g$. Thus, the gyroscope senses rotations of the robot 100 as the robot 100 moves with the gyroscope. The inertial measurement unit 106 may include more than one of the tri-axial accelerometer, the tri-axial magnetometer, or the tri-axial gyroscope to increase accuracy of the inertial measurement unit 106. In some examples, the inertial measurement unit 106 produces three dimensional measurements of a specific force and an angular rate. The inertial measurement unit 106 may also include a microprocessor.

The controller 102 is configured to process data relating to the inertial measurement unit 106, the actuators 107, and the sensor(s) 108 for operating the robot 100. The controller 102 receives an inertial measurement from the inertial measurement unit 106 (e.g., via a wired or wireless connection) disposed on the robot 100 and instructs actuation of at least one of the actuators 107 to alter a pose P of the robot 100 to move the CM of the robot 100 relative to the vertical gravitational axis $V_g$. In some examples, the controller 102 identifies changes in the inertial measurements between poses P and defines movements by at least one of the counter-balance body 120 or the articulated arm 170 for maintaining balance of the robot 100 by moving the CM relative to the vertical gravitational axis $V_g$.

The actuators 107 may include the counter-balance body actuator 123 connected to the counter-balance body 120 (e.g., counter-balance body); the knee actuators 153, 163 and the leg actuators 151, 161 each connected to the respective leg 130, 140; the drive motors 155, 165 each coupled to the respective drive wheel 136, 146 of the corresponding leg 130, 140; and the manipulator head actuator 182 connected to the manipulator head 180. The counter-balance body actuator 123 is configured to move the counter-balance body 120 relative to the torso 110. For instance, the controller 102 may instruct actuation of the counter-balance body actuator 123 to move/pitch the counter-balance body 120 about the lateral axis (y-axis) relative to the torso 110. The manipulator head actuator 182 is configured to move the manipulator head 180 relative to the manipulator arm 170. For instance, the controller 102 may instruct actuation of the manipulator head actuator 182 to move/pitch the manipulator head 180 about the lateral axis (y-axis) relative to the manipulator arm 170. In some examples, the controller 102 actuates the manipulator head actuator 182 to operate the manipulator head 180 as a second counter-balance body for altering the pose P of the robot 100 by moving the CM of the robot 100 relative to the vertical gravitational axis $V_g$.

Each leg actuator 151, 161 (disposed at or near the corresponding hip joint 150, 160) is configured to rotate the upper portion 133, 143 of the respective leg 130, 140 relative to the torso 110. For instance, the controller 102 may instruct actuation of the leg actuator 151 associated with the right hip joint 150 to cause the upper portion 133 of the right leg 130 to move/pitch around the lateral axis (y-axis) relative to the counter-balance body 120. Similarly, the controller 102 may instruct actuation of the leg actuator 161 associated with the left hip joint 160 to cause the left leg 140 to move/pitch around the lateral axis (y-axis) relative to the counter-balance body 120.

Each drive motor 155, 165 is configured to apply the corresponding axle torque for rotating the respective drive wheel 136, 146 about the corresponding ankle joint 154, 164 to move the drive wheel 136, 146 across the ground surface 12 along the fore-aft axis (x-axis). For instance, the axle torque may cause the drive wheel 136, 146 to rotate in a first direction for moving the robot 100 in a forward direction along the fore-aft axis (x-axis) and/or cause the drive wheel 136, 146 to rotate in an opposite second direction for moving the robot 100 in a rearward direction along the fore-aft axis (x-axis). The controller 102 may instruct actuation of each drive motor 155, 165 via a corresponding axle torque command that specifies a magnitude and direction of axle torque for the drive motor 155, 165 to apply for rotating the respective drive wheel 136, 146 in the forward or backward direction. Based on the inertial measurement received from the inertial measurement unit 106, the controller 102 may provide a corresponding axle torque command to at least one of the drive motors 155, 165 to instruct the drive motor 155, 165 to apply the corresponding axle torque in order to control tilt to maintain or restore balance of the robot 100.

The sensor(s) 108 of the control system 10 may include, without limitation, one or more of force sensors, torque sensors, velocity sensors, acceleration sensors, position sensors (linear and/or rotational position sensors), motion sensors, location sensors, load sensors, temperature sensors, touch sensors, depth sensors, ultrasonic range sensors, infrared sensors, object sensors, and/or cameras. The sensors 108 may disposed on the robot 100 at various locations such as the torso 110, counter-balance body 120, the right leg 130, the left leg 140, the drive wheels 136, 146, the articulated arm 170, and/or the end effector 180. The sensors 108 are configured to provide corresponding sensor data to the controller 102 for monitoring and controlling operation of the robot 100 within an environment. In some examples, the controller 102 is configured to receive sensor data from sensors physically separated from the robot 100. For instance, the controller 102 may receive sensor data from a proximity sensor disposed on a target object the robot 100 is configured to locate and transport to a new location.

The sensor data from the sensors 108 may allow the controller 102 to evaluate conditions for maneuvering the robot 100, altering a pose P of the robot 100, and/or actuating various actuators 107 for moving/rotating mechanical components such as the counter-balance body 120, the right leg 130, the left leg 140, the drive wheels 136, 146 rotatably coupled to the corresponding leg 130, 140, the articulated arm 170, and the end effector 180. In some examples, the sensor data includes rotational positions of the back joint 122, the hip joint(s) 150, 160, and/or the articulated arm joints 176a-c used to indicate a state of at least one of the counter-balance body 120, the right leg 130, the left leg 140, the articulated arm 170, or the end effector 180. In some examples, the robot 100 employs one or more force sensors to measure load on the actuators that move the counter-balance body 120, the right leg 130, the left leg 140, the drive wheels 136, 146 rotatably coupled to the corresponding leg 130, 140, the articulated arm 170, or the end effector 180. The sensors 108 may further include position sensors to sense states of extension, retraction, and/or rotation of the counter-balance body 120, the right leg 130, the left leg 140, the drive wheels 136, 146 rotatably coupled to the corresponding leg 130, 140, the articulated arm 170, or the end effector 180.

Other sensors 108 may capture sensor data corresponding to the terrain of the environment and/or nearby objects/obstacles to assist with environment recognition and navigation. For instance, some sensors 108 may include RADAR (e.g., for long-range object detection, distance determination, and/or speed determination) LIDAR (e.g., for short-range object detection, distance determination, and/or speed determination), VICON® (e.g., for motion capture), one or more imaging (e.g., stereoscopic cameras for 3D vision), perception sensors, a global positioning system (GPS) device, and/or other sensors for capturing information of the environment in which the robot 100 is operating.

In some implementations, the control system 10 includes one or more power sources 109 configured to power various components of the robot 100. The power sources 109 employed by the robot 100 may include, without limitation, a hydraulic system, an electrical system, energy storage device(s) (e.g. batteries), and/or pneumatic devices. For instance, one or more energy storage devices may provide power to various components (e.g., actuators 107) of the robot 100. The drive motors 155, 165 may include electric motors that receive power from one or more energy storage devices. In some examples, the counter-balance body 120 defines a compartment for storing and retaining energy storage devices. The energy storage devices may be chargeable via wired connections or wireless (e.g. induction) connections to an external power source. Energy storage devices could also be charged using solar energy (e.g., generated via solar panels disposed on the robot 100). In some examples, the energy storage devices are removable so that depleted energy storage devices can be replaced with fully-charged energy storage devices. Gasoline engines could also be employed. A hydraulic system may employ hydraulic motors and cylinders for transmitting pressurized fluid for operating various components of the robot 100.

Figure 2:
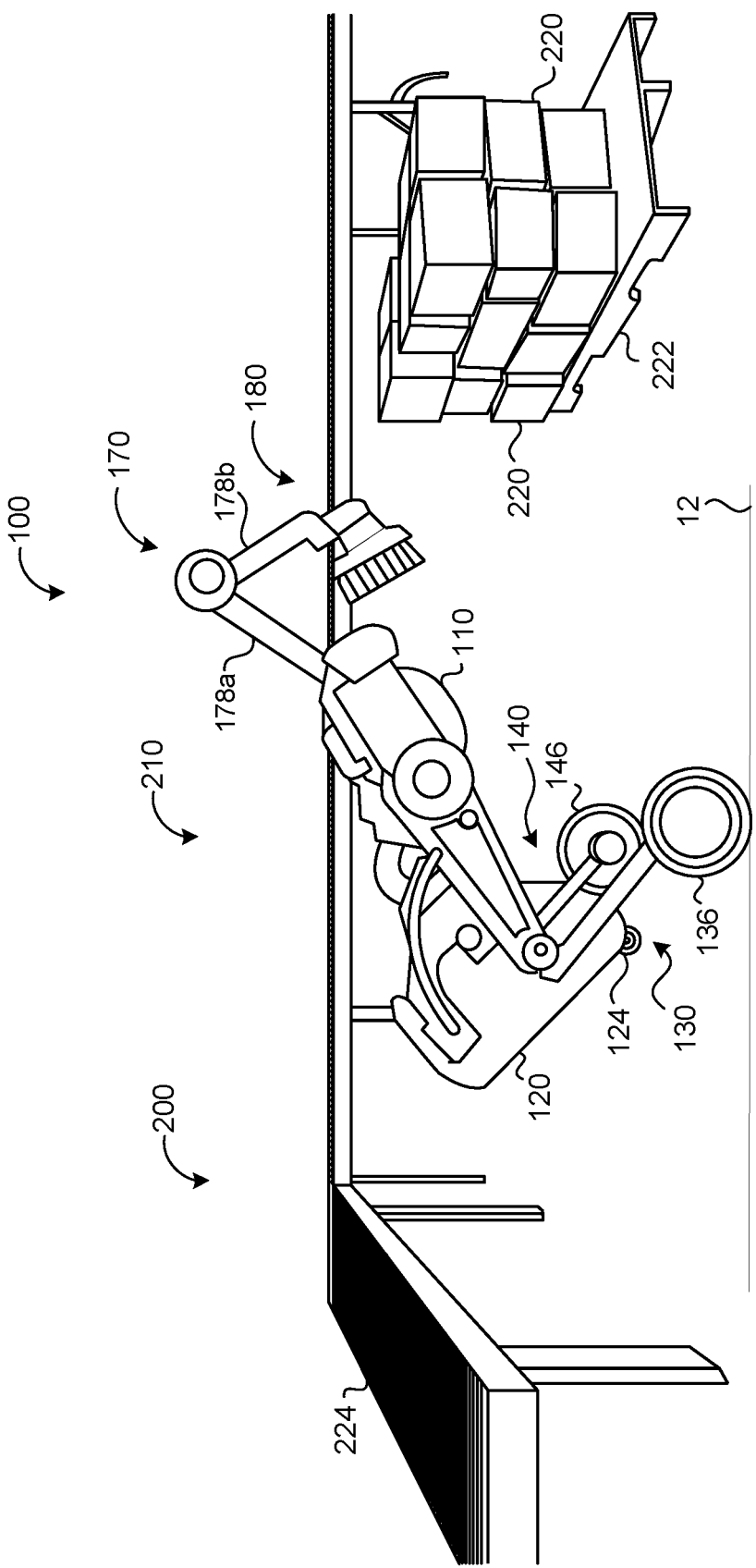
FIG. 2 is a schematic view of the robot of FIG. 1A in a work environment.

FIG. 2 shows the robot 100 maneuvering in a work environment 200 while operating in a work mode 210. The work environment 200 may include, without limitation, a storage facility, distribution center, or fulfillment center. In the example shown, the work environment 200 includes a plurality of boxes/packages 220 stacked on top of one another upon a pallet 222 lying on a ground surface 12 and a conveyer belt 224. While operating in the work mode 210, the robot 100 may drive across the ground surface 12 to move boxes/packages 220 from one of the pallet 222 or the conveyer belt 224 to the other one of the pallet 222 or the conveyer belt 224. For instance, the robot 100 may approach the pallet 222, move the articulated arm 170 to position the end effector 180 relative to one of the boxes/packages 220, take hold of the box 220 with the end effector 180, and then carry the box 220 retrieved from the pallet for placement on the conveyer belt 224. The robot 100 may include at least one perception sensor 108 disposed on the end effector 180 for identifying and localizing a target box 220 to take hold of. While in the work mode 210, the robot 100 dynamically balances on the right drive wheel 136 and the left drive wheel 146 on the work surface 12, while keeping the non-drive wheel 124 off of the work surface 12. Here, the robot 100 is in a high energy state requiring high kinetic and/or potential energy so that the robot 100 can dynamically balance on the right drive wheel 136 and the left drive wheel 146 while operating in the work mode. For example, the robot 100 may require approximately 1400 Joules of energy to operate in the work mode 210. During operation in the work mode 210, the robot 100 may instruct the actuators 107 to move the legs 130, 140, the articulated arm 170, and the counter-balance body 120 relative to the IPB 110 as needed to alter the pose P of the robot 100 to balance and maintain the robot 100 in the upright position in scenarios when the robot 100 is moving and/or carrying a load (e.g., a box/package 220). Typically, the robot 100 operates autonomously (i.e., without any manual control from a human operator) while operating in the work mode 210 and will remain isolated in the work environment 200 (i.e., isolated from humans and/or other robots) for safety concerns. Moreover, the robot 100 requires use of a majority of the equipped actuators 107 and sensors 108 to operate in the work mode 210. For example, the robot 100 may use ten or more actuators 107 and fifty or more sensors 108 in order to lift and move objects 220 and dynamically balance on the right drive wheel 136 and the left drive wheel 146 on the work surface 12.

Figure 3:
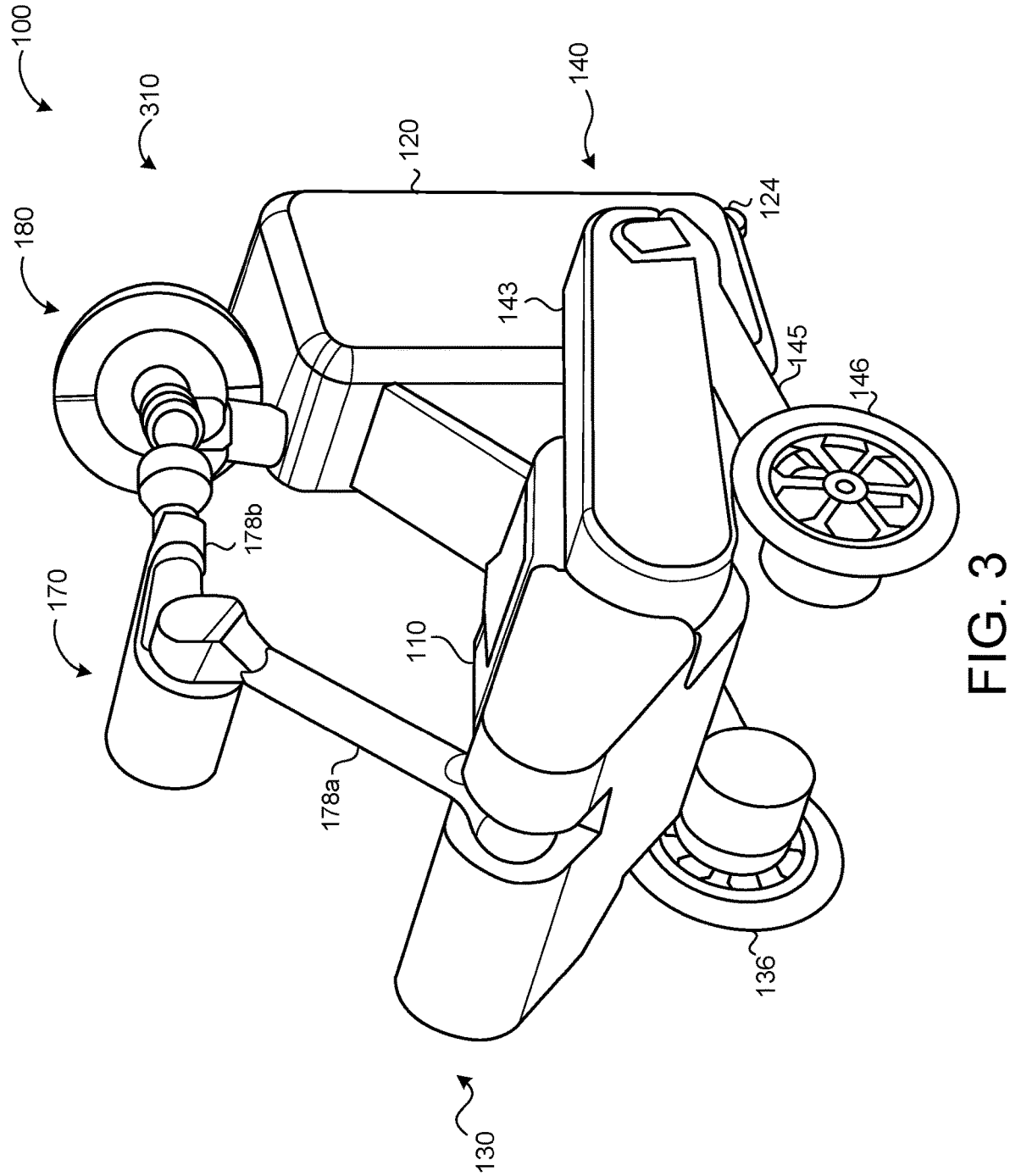
FIG. 3 is a schematic view of the robot of FIG. 1A operating in a travel mode.
Figure 4:
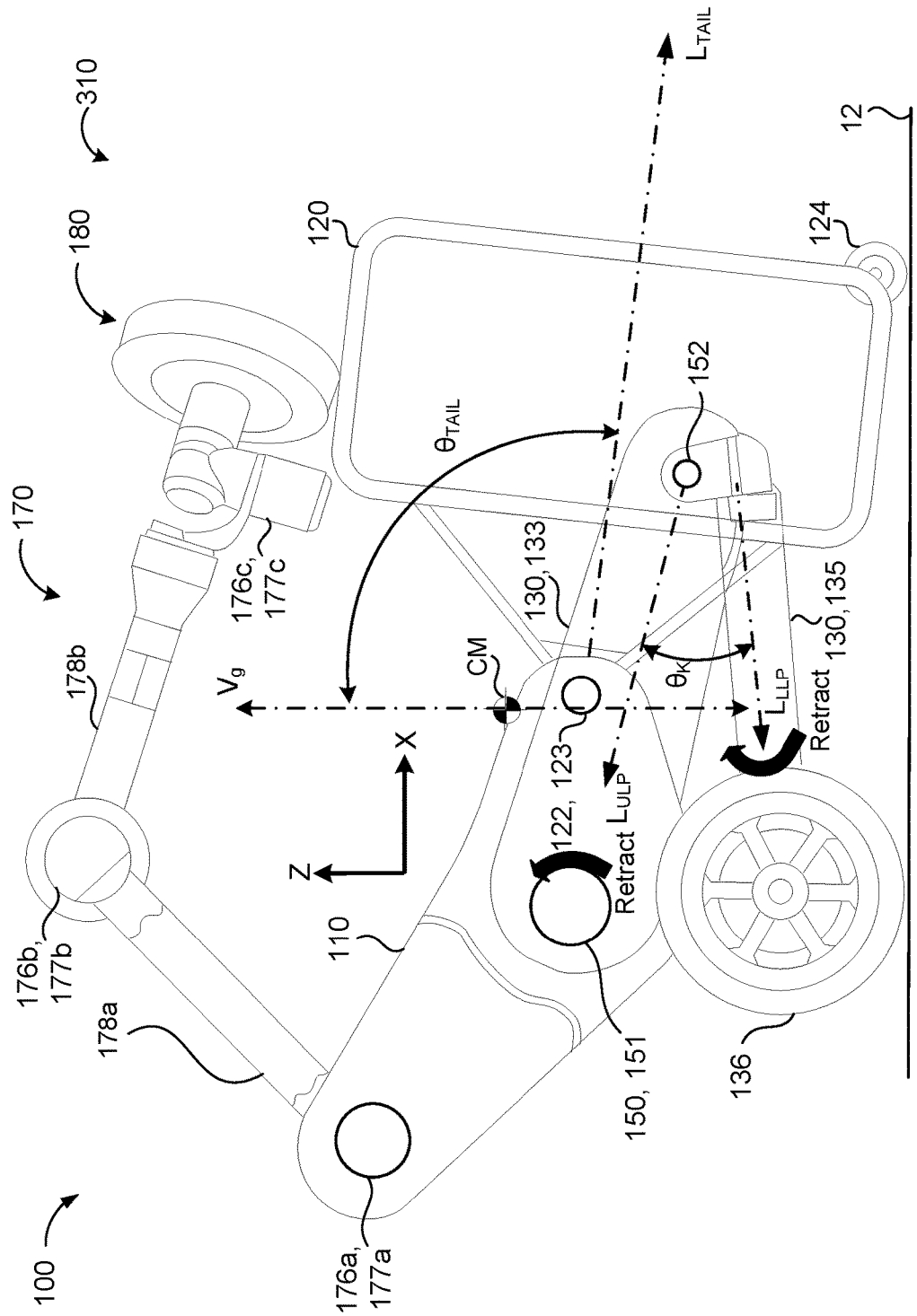
FIG. 4 is a schematic view of the robot of FIG. 1A operating in the travel mode and showing the center of mass.

Referring now to FIGS. 3 and 4, the robot 100 may operate in a travel mode 310 by assuming a travel posture when full work functionality by the robot 100 is not desirable and/or not required (e.g., when near humans, when travelling from one work environment 200 to another work environment 200, when charging an energy storage device, etc.). Advantageously, operating in the travel mode 310 drastically reduces potential energy and/or kinetic energy requirements compared to operation in the work mode 210 by providing a statically stable mode (i.e., the travel posture) for the robot 100 to operate in. As used herein, the statically stable mode refers to refers to the robot 100 statically balancing the right drive wheel 136, the left drive wheel 146, and the non-drive wheel 124 on the ground surface 12 during operation in the travel mode 310. The travel mode 310 is reliant upon less actuators and less sensors than the work mode 210 to operate successfully. In other words, actuators and sensors that may be required for operating the robot in the work mode 210, but that are not required for operating the robot in the travel mode 310 may be disabled/inactive during operating in the travel mode 310. Thus, a lower number of actuators and/or sensors are active/enabled during operation in the travel mode 310 than during operation in the work mode 210. For example, the travel mode may only need to actuate three or less actuators 107 and use less than ten sensors 108 to assume and maintain the travel posture during operation in the travel mode 310, thereby greatly reducing the probability of actuator and/or sensor failures. Furthermore, control algorithms that control operation of the robot 100 may be greatly simplified during operation in the travel mode 310 due to the reduced actuator control and sensor use requirements compared to the work mode 210, which further reduces the possibility of a failure (e.g., from a coding error). In the event of an emergency stop, the travel mode 310 allows for graceful failure. That is, the probability that the robot 100 may cause harm or damage as the result of a component failure, software error, or emergency stop while operating in the travel mode 310 is greatly reduced (e.g., the robot 100 will not topple over from losing balance). While the robot 100 may operate autonomously in the travel mode 310, the robot 100 may also be manually controlled (e.g., via a joystick).

To operate in the travel mode 310, the controller 102 may actuate the counter-balance body actuator 123 to cause the counter-balance body 120 to lower towards the ground surface 12 (e.g., rotates the counter-balance body 120 in the clockwise direction relative to the view of FIG. 4) at least until the non-drive wheel 124 comes into contact with the ground surface 12. For example, the controller 102 may actuate the counter-balance body actuator 123 to rotate the counter-balance body 120 relative to the IPB 110 by moving/pitching about the lateral axis (y-axis) downward toward the ground surface 12 such that the non-drive wheel 124 opposes the ground surface 12. Referring to FIG. 4, the counter-balance body 120 has a longitudinal axis $L_{TAIL}$ extending from the back joint 122 (e.g., pitch joint) and is configured to pivot at the back joint 122 to move/pitch around the lateral axis (y-axis) relative to the IPB 110 (in both the clockwise and counter-clockwise directions relative to the view shown in FIG. 4). The posture/pose of the robot 100 may be defined at least in part by a rotational angle $\theta_{TAIL}$ of the counter-balance body 120 relative to the vertical gravitational axis $V_g$. As such, the counter-balance body actuator 123 (e.g., a rotational actuator) may be positioned at or near the back joint 122 for controlling movement by the counter-balance body 120 about the lateral axis (y-axis), thereby adjusting the rotational angle $\theta_{TAIL}$ of the longitudinal axis $L_{TAIL}$ of the counter-balance body 120 relative to the vertical gravitational axis $V_g$ and the IPB 110. In the example shown, to transition the robot 100 from operating in the work mode 210 to operating in the travel mode 310 the counter-balance body actuator 123 may pitch the counter-balance body 120 about the lateral axis (y-axis) in the clockwise direction in a manner that increases the rotational angle $\theta_{TAIL}$ of the counter-balance body 120 relative to the vertical gravitational axis $V_g$.

Moreover, transitioning to operation in the travel mode 310 requires lowering the center of mass CM of the robot 100 by, in some examples, retracting the length of each leg 130, 140 to cause the height of each corresponding leg 130, 140 with respect to the ground surface 12 to reduce. With continued reference to FIG. 4, rotation by the lower portion 135 of the right leg 130 about the right knee joint 152 relative to the upper portion 133 of the right leg 130 in the clockwise direction may cause the right leg 130 to retract. At the same time, the upper portion 133 of the right leg 130 may rotate about the right hip joint 150 relative to the IPB 110 in the counter-clockwise direction to cause the right leg 130 to retract. In the example shown, a knee joint angle $\theta_K$ defining a rotational angle of a longitudinal axis $L_{LP}$ of the lower portion 135 relative to a longitudinal axis $L_{UP}$ of the upper portion 133 of the right leg 130 decreases as the right leg 130 retracts to cause the center of mass CM of the robot 100 to lower and bring the non-drive wheel into contact with the ground surface 12. While obstructed from the view of FIG. 4, in a similar manner the left leg 140 may retract by rotating the lower portion 145 of the left leg 140 about the left knee joint 162 relative to the upper portion 143 and/or rotating the upper portion 143 of the left leg 140 about the left hip joint 160 relative to the IPB 110. Accordingly, in response to receiving a travel mode command to operate the robot 100 in the travel mode 310, the controller 102 may actuate the counter-balance body actuator 123 to move the counter-balance body 120 about the lateral axis (y-axis) relative to the IPB 110 and/or retract the legs 130, 140 in any prescribed manner to lower the CM of the robot 100 and bring the non-drive wheel 124 into contact with the ground surface 12.

During operation in the travel mode 310 with the non-drive wheel 124 contacting the ground surface 12, the counter-balance body actuator 123 may adjust the rotational angle $\theta_{TAIL}$ of the counter-balance body 120 relative to the vertical gravitational axis $V_g$ to tune/adjust the travel posture. For example, the controller 102 may actuate the counter-balance body actuator 123 to increase the rotational angle $\theta_{TAIL}$ while the non-drive wheel 124 is in contact with the ground surface 12, thereby causing the wheel base (i.e., a distance extending along the fore-aft axis (x-axis) between the drive wheels 136, 146 and the non-drive wheel 124 to decrease. Here, decreasing the wheel base may be helpful in scenarios when the robot 100 requires an increase in ground clearance or other height adjustment while operating in the travel mode 310. Lowering the counter-balance body 120 to bring the non-drive wheel 124 into contact with the ground surface 12 both lowers the CM of the robot 100 and increases stability by providing a statically balanced travel posture/pose. That is, the robot 100 statically maintains balance with the three wheels 124, 136, 146 in contact with the ground surface 12 instead of having to dynamically balance only the two drive wheels 136, 146 on the ground surface 12 as in the work mode 210. The drive wheels 136, 146 and the respective drive motors 155, 165 remain active and enabled to provide both forward/reverse motion across the ground surface 12 as well as control. The non-drive wheel 124 may be centered on the counter-balance body 120 to maximize stability.

In some implementations, the articulated arm joints 176a-c stow in an attitude at an end of the range of motion of one or more of the joints 176a-c when the robot 100 operates in the travel mode 310. Each articulated arm joint 176a-c may be controlled by a corresponding actuator 177a-c to move the portions 178a, 178b of the articulated arm 170 and the end effector 180 relative to one another and relative to the IPB 110. That is, the actuators 177a-c, in some examples, are inactive/disabled to cause the joints 176a-c to hold/rest at end stops while the robot 100 operates in the travel mode 310. That is, the joints 176a-c may have a limited range of motion due to for example, physical constraints of the joints 176a-c and/or physical constraints of the portions 178a, 178b of the articulated arm 170 and/or the end effector 180 (e.g., collisions between the portions 178a, 178b and/or the end effector 180 with other portions of the robot 100). While operating in the travel mode 310, the controller 102 may actuate the actuators 177a-c to hold the joints 176a-c at a maximum end of the limited range of motion (i.e., an end stop). As depicted in FIGS. 3 and 4, the joints 176a-c may retract the articulated arm 170 such that the CM of the robot 100 is further lowered and the arm 170 is maintained in a central location between the drive wheels 136, 146 and the non-drive wheel 126. The articulated arm 170 may stow or rest the effector head 180 at or near the top (relative to FIG. 4) of the counter-balance body 120. In some implementations, the effector head 180 is in contact with the counter-balance body 120 and the counter-balance body 120 supports the articulated arm 170 to alleviate, at least in part, potential energy requirements on one or more of the joints 176a-c. Optionally, the joints 176a-c may be software locked. That is, during a software lock, the controller 102 cannot alter positions of the joints 176a-c until certain conditions are met. For example, the joints 176a-c may remain locked until the robot 100 enters the work mode 210. This may further decrease control complexity and reduce the likelihood of errors or failures.

Figure 5:
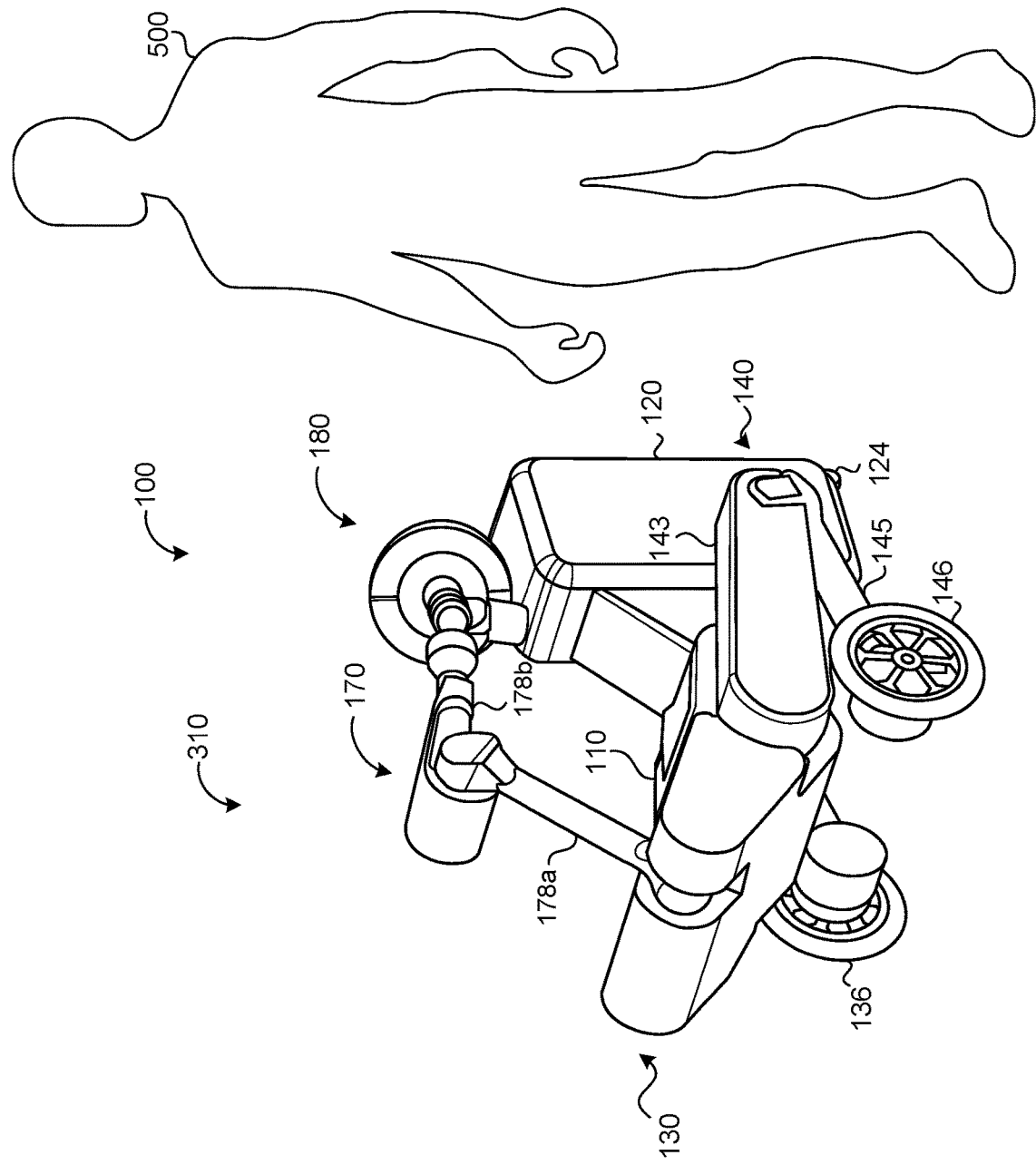
FIG. 5 is another schematic view of the robot of FIG. 1A depicted in the travel mode next to a human.

With continued reference to FIGS. 3 and 4, the hip actuators 151, 161 and the knee actuators 153, 163 (if applicable) may be similarly disabled or software locked to hold the hip joints 150, 160 and the knee joints 152, 162 at end stops associated with fully retracted positions of the legs 130, 140. While operating in the travel mode 310, the robot 100 may continue to operate autonomously, or, alternatively, operated via manual control (e.g., a joystick). As depicted in FIG. 5, the travel mode 310 lowers the height and CM of the robot 100 such that operation (e.g., travelling) of the robot 100 is safer near, for example, a human 500.

Figure 6:
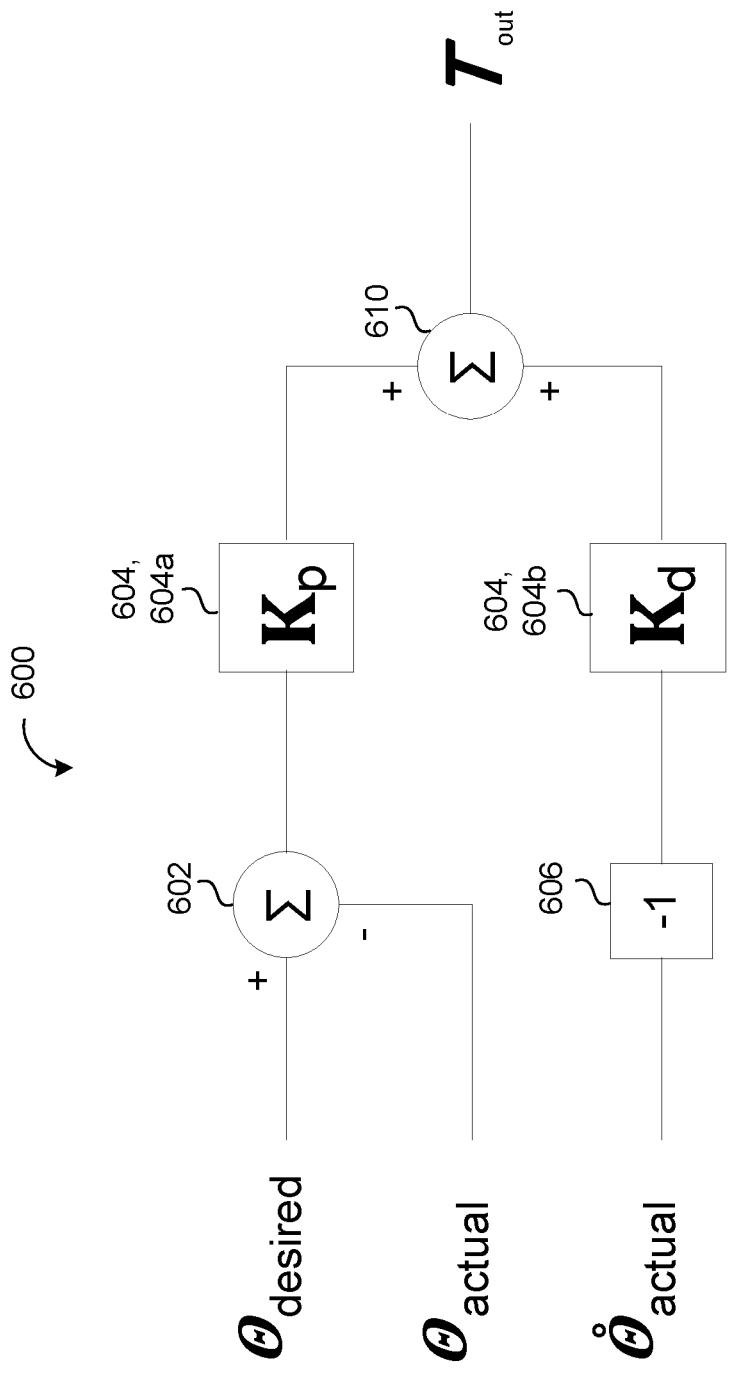
FIG. 6 is a block diagram of a counter-balance body actuator control of the robot of FIG. 1A.

Referring now to FIG. 6, the travel posture of the robot 100 while operating in travel mode 310 is set, at least in part, by controlling the counter-balance body actuator 123 adjust the longitudinal axis $L_{TAIL}$ of the counter-balance body 120 relative to the vertical gravitational axis $V_g$ and the IPB 110. The controller 102, in some implementations, controls the counter-balance body actuator 123 using a proportional-derivative (PD) control loop 600 depicted in FIG. 6. That is, the controller 102 determines a difference between a desired angular position ($\theta_{desired}$) of the counter-balance body actuator 123 and an actual angular position ($\theta_{actual}$) of the counter-balance body actuator 123 at a difference unit 602 and multiplies the result by a proportional constant $K_p$ at multiplier 604, 604a. Here, the actual angular position $\theta_{actual}$ of the counter-balance body actuator 123 corresponds to a current target rotational angle $\theta_{TAIL}$ of the counter-balance body 120 relative to the vertical gravitational axis $V_g$ and the desired angular position ($\theta_{desired}$) corresponds to a target rotational angle $\theta_{TAIL}$ of the counter-balance body 120 relative to the vertical gravitational axis $V_g$ the counter-balance body 120 needs to move to. The actual angular velocity of the counter-balance body actuator 123 ($\theta°_{actual}$, the derivative of the angular position) is negated at unit 606 and multiplied by a derivative constant $K_d$ at multiplier 604, 604b. Constants $K_p$ and $K_d$ may be any number to appropriately weight the position and velocity of the counter-balance body actuator 123. The outputs from the multipliers 604a, 604b are summed at summer 610 to create a torque output $T_{out}$. The controller 102, via the PD control loop 600, applies responsive corrections to the counter-balance body 120 by adjusting the amount of output torque $T_{out}$ supplied by the actuator 123.

Figure 7A:
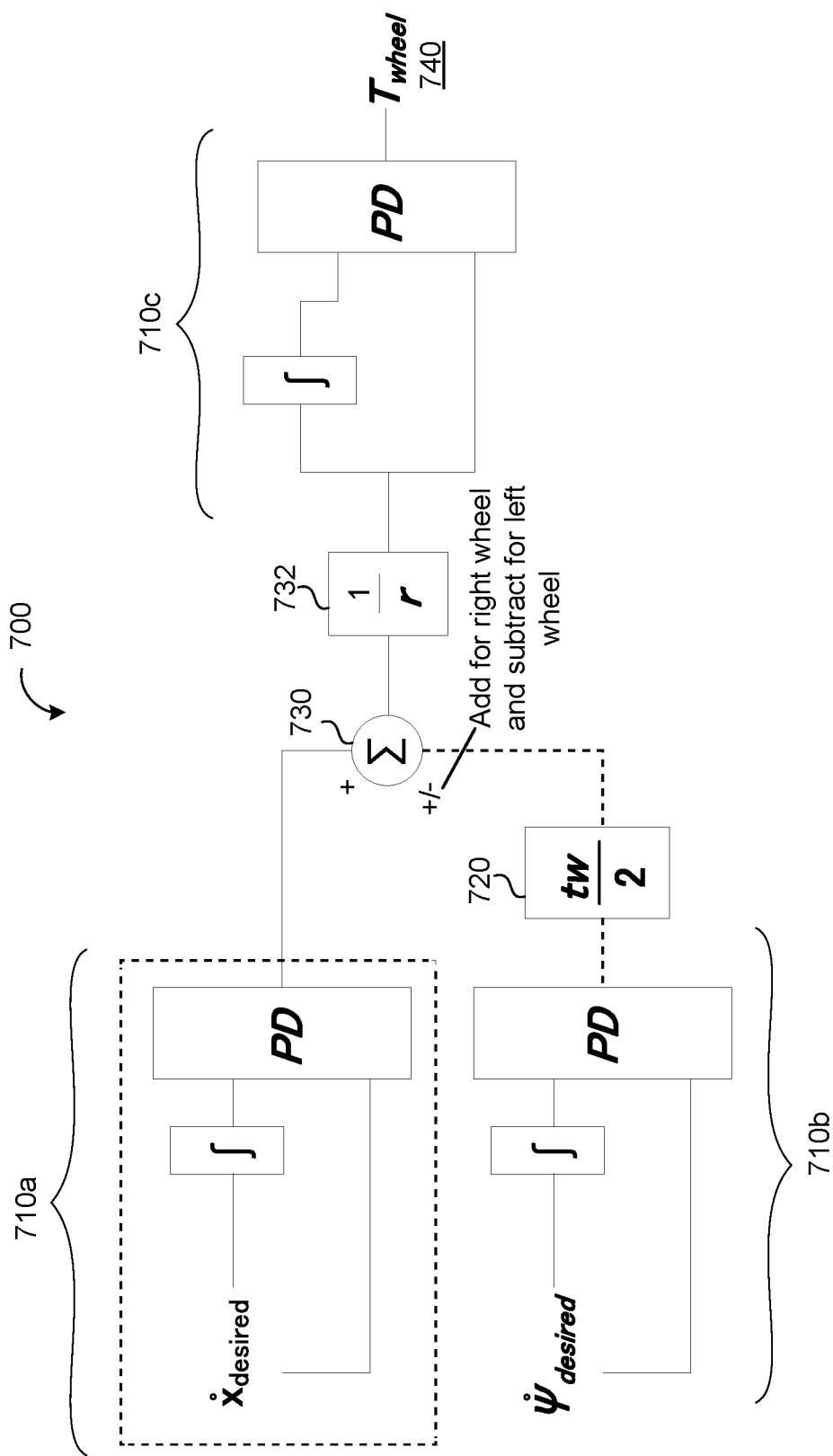
FIGS. 7A and 7B are block diagrams of drive wheel control of the robot of FIG. 1A.
Figure 7B:
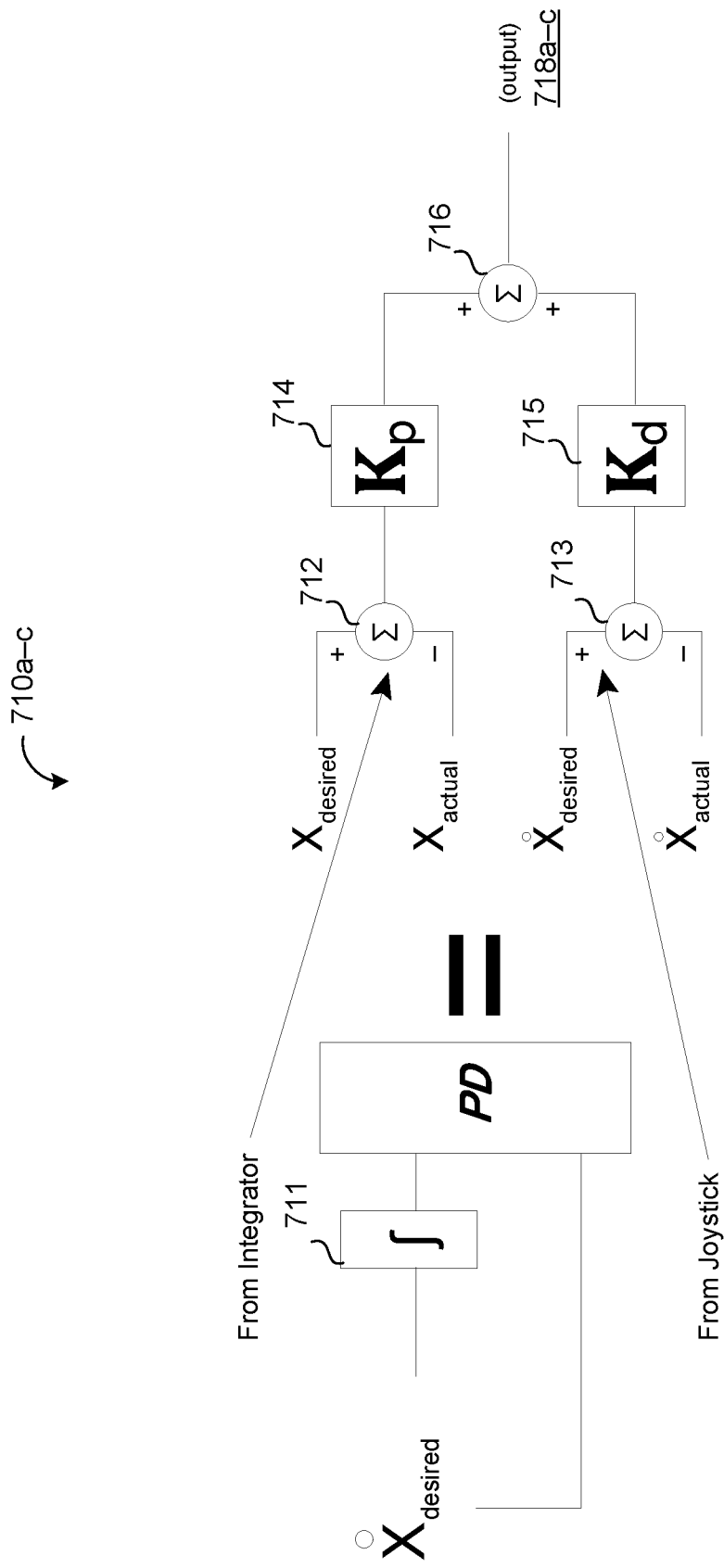

Referring now to FIGS. 7A and 7B, the controller 102, in some examples, accepts user input to move the robot 100 (i.e., joystick inputs) and executes control loop 700 (FIG. 7A) to control drive wheels 136, 146 to perform the commanded movement. Similar control loops 700 may be used when the robot 100 is operating autonomously. A target forward (or reverse) velocity of the robot 100 $\dot{x}_{desired}$ is input to the control loop as part of a sub-loop 710a. Forward and reverse directions are defined as the directions extending along fore-aft axis (x-axis) shown in FIGS. 1A and 1B. Referring now to FIG. 7B, the sub-loop 710a first includes integrating the desired velocity and the actual velocity at integrator 711, resulting in a desired position ($x_{desired}$) and an actual position ($x_{actual}$). Then, the sub-loop 710a includes subtracting the actual position from the desired position at difference unit 712 and multiplying by constant $K_p$ at multiplier 714 while also subtracting the actual velocity from the desired velocity at difference unit 713 and multiplying by constant $K_d$ at multiplier 715. The outputs from the multipliers 714, 715 are then summed at summer 716 to produce output 718a.

Referring back to FIG. 7A, sub-loop 710b receives a desired yaw motion ($\Psi°_{desired}$). The sub-loop 710b includes the same actions as sub-loop 710a, but with yaw inputs (i.e., $\Psi_{desired}$, $\Psi_{actual}$, $\Psi°_{desired}$, and $\Psi°_{actual}$) as opposed to forward velocity inputs (i.e., $x_{desired}$, $x_{actual}$, $\dot{x}_{desired}$, and $\dot{x}_{actual}$). More specifically, the desired yaw velocity $\Psi°_{desired}$ (i.e., the velocity of the robot 100 turning left or right) is input to the control loop as part of the sub-loop 710b. Again referring to FIG. 7B, the sub-loop 710b includes integrating the velocity to obtain a position at integrator 711. While FIG. 7B depicts the inputs as the forward velocity (i.e., $\dot{x}_{desired}$), this is exemplary only, and the inputs to each sub-loop 710a-c are identified in FIG. 7A. For example, sub-loop 710b uses the angular velocity as inputs (i.e., $\Psi°_{desired}$). The sub-loop 710b, after integrating at integrator 711, includes subtracting the actual yaw position from the desired yaw position at difference unit 712 and multiplying by constant $K_p$ at multiplier 714 while also subtracting the actual yaw velocity from the desired yaw velocity at difference unit 713 and multiplying by constant $K_d$ at multiplier 715. The outputs from the multipliers 714, 715 are then summed at summer 716 to produce output 718b. Referring back to FIG. 7A, the output 718b is then multiplied at multiplier 720 by a track width (tw) divided by two. The track width tw is defined as a lateral distance between the right drive wheel 136 and the left drive wheel 146. The track width tw may be measured, for example, from the center of the right drive wheel 136 to the center of the left drive wheel 146.

With continued reference to FIG. 7A, the output 718a from the sub-loop 710a and the output 718b from the sub-loop 710b are summed at summer 730. In some implementations, the outputs 718a, 718b are added together for the right drive wheel 136 while the output 718a is added to the inverse of the output 718b (i.e., the output 718b is subtracted from the output 718a) for the left drive wheel 146. That is, a separate control loop 700 executes for both the right drive wheel 136 and the left drive wheel 146, with the only difference between the control loops being the change between addition and subtraction at 730. The output from the summer 730 (for either the right drive wheel 136 or the left drive wheel 146) is, in some examples, multiplied by the inverse of the radius (r) of the wheels 136, 146 at multiplier 732. That is, the output from summer 730 is divided by the radius of the drive wheels 136, 146 (with each drive wheel 136, 146 having the same radius). The output from multiplier 732 is the input to sub-loop 710c.

Referring again to FIG. 7B, the sub-loop 710c includes integrating the output from multiplier 732 (FIG. 7A) at integrator 711 and then subtracting the actual position from the output at difference unit 712. The output from difference unit 712 is then multiplied by constant $K_p$ at multiplier 714. The actual velocity is also, at difference unit 713, subtracted from the output of multiplier 732 (FIG. 7A) and multiplied by constant $K_d$ at multiplier 715. The outputs from multipliers 714, 715 are then summed at summer 716 to produce output 718c. In this case, the output 718c is the torque value ($T_{wheel}$) 740 (FIG. 7A) for the appropriate wheel (i.e., the right drive wheel 136 or the left drive wheel 146). The torque value 740 represents the amount of torque the controller 102 will command the drive motor 155, 165 to apply to the corresponding drive wheel 136, 146.

Figure 8:
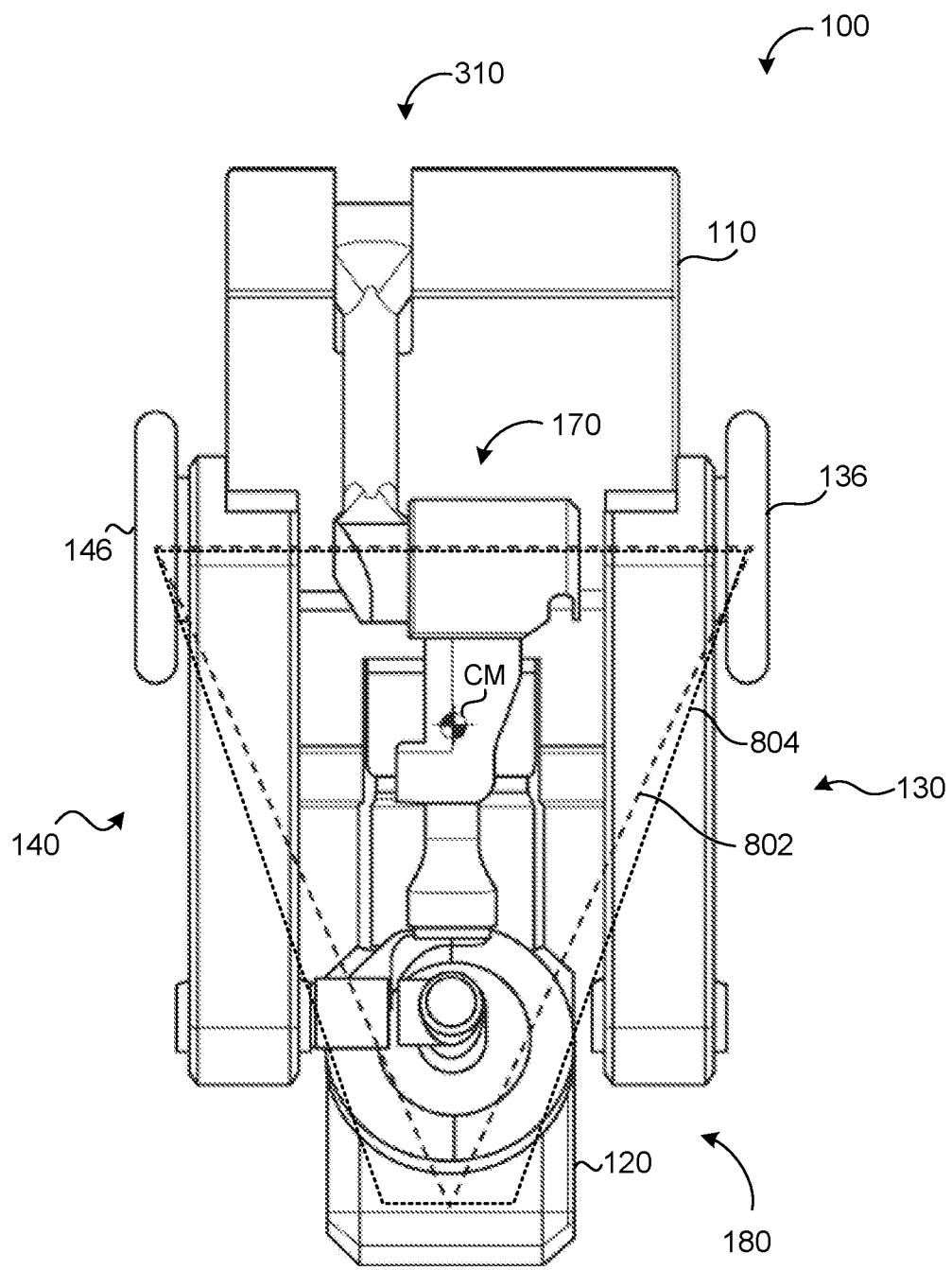
FIG. 8 is a schematic view of the robot of FIG. 1A operating in the travel mode and showing the center of mass within a support polygon of the robot.

Referring now to FIG. 8, a support polygon 802 represents a region in which the CM of the robot 100 must maintain for stability. The points (i.e., vertices) of the support polygon 802 reflect the locations where the wheels 124, 136, 146 contact the ground surface 12. The larger the area of the support polygon 802, the more stable the robot 100 is. For example, a longer wheelbase (i.e., the distance between the drive wheels 136, 146 and the non-drive wheel 124) increases the area of the support polygon 802 and therefore increases stability. As previously discussed, the controller 102 may adjust the wheelbase of the robot 100 via actuating the counter-balance body actuator 123. In some implementations, the robot 100 includes two non-drive wheels 124. For example, the second non-drive wheel 124 may be disposed on the counter-balance body 120 next to the first non-drive wheel 124 to form a linear configuration with the first non-drive wheel 124 that is parallel to a linear configuration of the drive wheels 136, 146. In such an example, the second non-drive wheel 124 further increases stability, as depicted by support polygon 804. The support polygon 804 has four vertices (versus the three of the support polygon 802) due to the extra non-drive wheel contacting the ground surface 12. The support polygon 804 has a greater area than the support polygon 802, representing the increased stability provided by the additional non-drive wheel 124.

Figure 9:
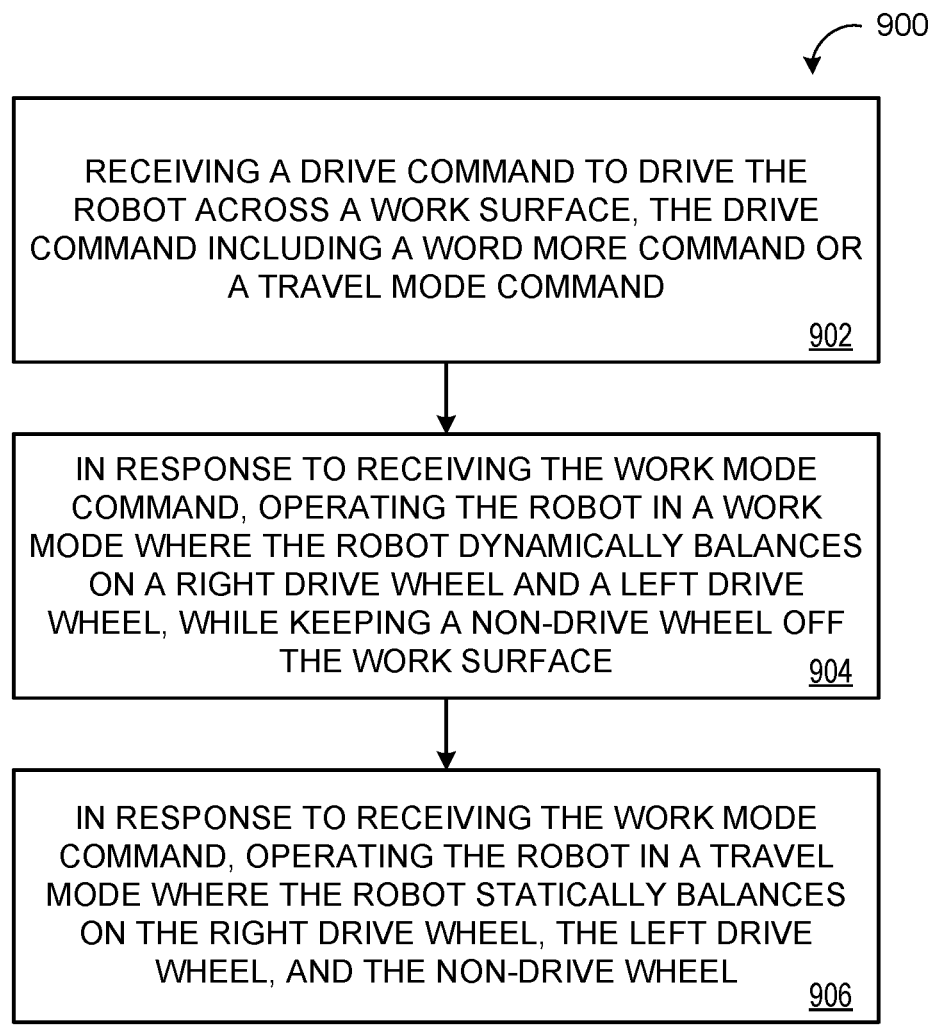
FIG. 9 is a flow chart of an example arrangement of operations for a method of operating a robot.

FIG. 9 is a flowchart of an example method 900 for operating a robot 100 in a work mode or a travel mode. The flowchart starts at operation 902 by receiving, at data processing hardware 102 of the robot 100, a drive command to drive the robot across a work surface 12, the drive command comprising a work mode command or a travel mode command. In response to receiving the work mode command, the method 900 includes operating, by the data processing hardware 102, the robot 100 in a work mode 210. In the work mode 210, the robot 100 dynamically balances on a right drive wheel 136 and a left drive wheel 146 on the work surface 12, while keeping a non-drive wheel 124 off of the work surface 12. In response to receiving the travel mode command, the method 900 includes operating, by the data processing hardware 102, the robot 100 in a travel mode 310. In the travel mode 310, the robot 100 statically balances on the right drive wheel 136, the left drive wheel 146, and the non-drive wheel 124 in contact with the work surface 12.

Figure 10:
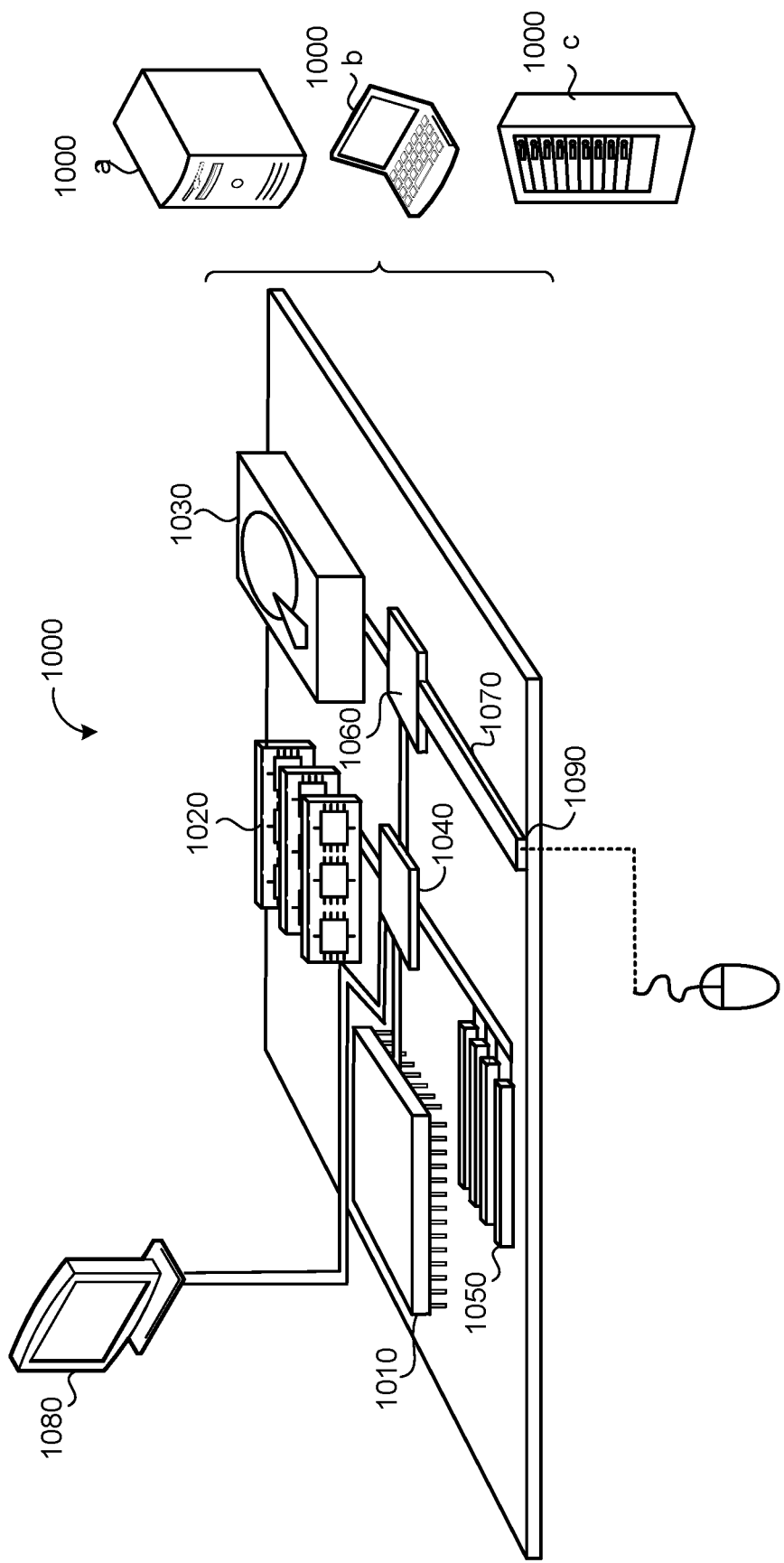
FIG. 10 is a schematic view of an example computing device that may be used to implement the systems and methods described herein.

FIG. 10 is schematic view of an example computing device 1000 that may be used to implement the systems and methods described in this document. The computing device 1000 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 1000 includes a processor 1010, memory 1020, a storage device 1030, a high-speed interface/controller 1040 connecting to the memory 1020 and high-speed expansion ports 1050, and a low speed interface/controller 1060 connecting to a low speed bus 1070 and a storage device 1030. Each of the components 1010, 1020, 1030, 1040, 1050, and 1060, are interconnected using various busses, and may be mounted on a common motherboard or in other manners as appropriate. The processor 1010 can process instructions for execution within the computing device 1000, including instructions stored in the memory 1020 or on the storage device 1030 to display graphical information for a graphical user interface (GUI) on an external input/output device, such as display 1080 coupled to high speed interface 1040. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1020 stores information non-transitorily within the computing device 1000. The memory 1020 may be a computer-readable medium, a volatile memory unit(s), or non-volatile memory unit(s). The non-transitory memory 1020 may be physical devices used to store programs (e.g., sequences of instructions) or data (e.g., program state information) on a temporary or permanent basis for use by the computing device 1000. Examples of non-volatile memory include, but are not limited to flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to random access memory (RAM), dynamic random access memory (DRAM), static random access memory (SRAM), phase change memory (PCM) as well as disks or tapes.

The storage device 1030 is capable of providing mass storage for the computing device 1000. In some implementations, the storage device 1030 is a computer-readable medium. In various different implementations, the storage device 1030 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 1020, the storage device 1030, or memory on processor 1010.

The high speed controller 1040 manages bandwidth-intensive operations for the computing device 1000, while the low speed controller 1060 manages lower bandwidth-intensive operations. Such allocation of duties is exemplary only. In some implementations, the high-speed controller 1040 is coupled to the memory 1020, the display 1080 (e.g., through a graphics processor or accelerator), and to the high-speed expansion ports 1050, which may accept various expansion cards (not shown). In some implementations, the low-speed controller 1060 is coupled to the storage device 1030 and a low-speed expansion port 1090. The low-speed expansion port 1090, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1000a or multiple times in a group of such servers 1000a, as a laptop computer 1000b, or as part of a rack server system 1000c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:
   commanding a robot to operate in a first mode to perform an operation with an arm of the robot in a first area, the robot having a first wheel, a second wheel, and a third wheel, each of the first, second and third wheels being coupled to a body of the robot, the third wheel being coupled to a component that is rotatably coupled to the body at a joint, the component configured to lower or raise the third wheel from a ground surface when a rotational actuator is controlled to rotate the component relative to the body at the joint, the third wheel being elevated from the ground surface when in the first mode;
   receiving, by the robot, information identifying a second mode; and
   commanding the robot to operate in the second mode to move from the first area to a second area based on receiving the information identifying the second mode, the robot being balanced on the first, second and third wheels when in the second mode.

2. The computer-implemented method of claim 1, wherein the operations further comprise commanding the robot to operate in the first mode in the second area.

3. The computer-implemented method of claim 1, wherein performing the operation in the first mode comprises:
   identifying an object within a range of motion of the arm based on sensor data received from one or more sensors of the robot; and
   grasping the object with an end effector of the arm for transport.

4. The computer-implemented method of claim 1, wherein the operations further comprise commanding the robot to operate in the first mode in response to detecting that the robot is proximate to an object to be grasped within a range of motion of the arm.

5. The computer-implemented method of claim 1, wherein the second mode lowers a center of mass for the robot along a gravitational axis of the robot.

6. The computer-implemented method of claim 1, wherein the first mode allows movement of the arm such that the arm is not positioned above an axis between the first and second wheels of the robot, wherein, in the second mode, at least a portion of the arm is positioned above the axis between the first and second wheels of the robot.

7. The computer-implemented method of claim 1, wherein the second mode locks the arm in a position.

8. The computer-implemented method of claim 1, wherein the second mode disables one or more actuators of the arm.

9. The computer-implemented method of claim 1, wherein the robot has a center of mass, wherein the first mode causes the center of mass to be a first distance from a work surface supporting the robot, wherein the second mode causes the center of mass to be a second distance from the work surface, wherein the first distance is greater than the second distance.

10. A robot comprising:
   an arm having an end-effector;
   a body coupled to the arm opposite the end-effector;
   two or more drive wheels coupled to the body;
   a non-drive wheel coupled a component that is rotatably coupled to the body at a joint, the component configured to lower or raise the non-drive wheel from a ground surface when a rotational actuator is controlled to rotate the component relative to the body at the joint; and
   a controller configured to perform operations comprising:
      commanding the robot to operate in a first mode to perform an operation with the arm of the robot in a first area, the non-drive wheel being elevated from the ground surface when in the first mode;
      receiving, by the robot, information identifying a second mode; and
      commanding the robot to operate in the second mode to move from the first area to a second area based on receiving the information identifying the second mode, the robot being balanced on the two or more drive wheels and the non-drive wheel when in the second mode.

11. The robot of claim 10, wherein the operations further comprise commanding the robot to operate in the first mode in the second area.

12. The robot of claim 10, wherein performing the operation in the first mode comprises:
   identifying an object within a range of motion of the arm based on sensor data received from one or more sensors of the robot; and
   grasping the object with an end effector of the arm for transport.

13. The robot of claim 10, wherein the operations further comprise commanding the robot to operate in the first mode in response to detecting that the robot is proximate to an object to be grasped within a range of motion of the arm.

14. The robot of claim 10, wherein the second mode lowers a center of mass for the robot along a gravitational axis of the robot.

15. The robot of claim 10, wherein the first mode allows movement of the arm such that the arm is not positioned above an axis between the two or more drive wheels of the robot, wherein, in the second mode, at least a portion of the arm is positioned above the axis between the two or more drive wheels of the robot.

16. The robot of claim 10, wherein the second mode locks the arm in a position.

17. The robot of claim 10, wherein the second mode disables one or more actuators of the arm.

18. The robot of claim 10, wherein the robot has a center of mass, wherein the first mode causes the center of mass to be a first distance from a work surface supporting the robot, wherein the second mode causes the center of mass to be a second distance from the work surface, wherein the first distance is greater than the second distance.

19. The computer-implemented method of claim 1, wherein the first wheel and the second wheel are drive wheels and the third wheel is a non-drive wheel.

\* \* \* \* \*